United States Patent [19]

Coppola

[11] Patent Number: 5,896,465
[45] Date of Patent: Apr. 20, 1999

[54] REVERSE PRIORITIZED IMAGE TRANSMISSION

[75] Inventor: Stephen M. Coppola, Rochester, N.Y.

[73] Assignee: Harris Corporation, Melbourne, Fla.

[21] Appl. No.: 08/492,513

[22] Filed: Jun. 20, 1995

[51] Int. Cl.⁶ .............. G06K 9/36; G06K 9/40; G06K 9/46
[52] U.S. Cl. .......... 382/232; 382/240; 382/246; 382/250; 382/254; 358/261.1; 358/403; 358/426
[58] Field of Search ............. 382/169, 240, 382/246, 250, 254, 232, 261; 358/403, 426, 429, 433, 261.3

[56] References Cited

U.S. PATENT DOCUMENTS

| | | | |
|---|---|---|---|
| 4,903,138 | 2/1990 | Aragaki | 358/261.3 |
| 4,969,204 | 11/1990 | Melnychuck et al. | 382/240 |
| 5,128,776 | 7/1992 | Scorse et al. | 358/426 |
| 5,289,548 | 2/1994 | Wilson et al. | 382/250 |
| 5,321,520 | 6/1994 | Inga et al. | 358/403 |
| 5,333,212 | 7/1994 | Lightenberg | 382/250 |
| 5,351,306 | 9/1994 | Finkler et al. | 382/169 |
| 5,359,676 | 10/1994 | Fan | 382/246 |
| 5,363,205 | 11/1994 | Shou et al. | 358/429 |
| 5,426,513 | 6/1995 | Scorse et al. | 358/433 |
| 5,432,870 | 7/1995 | Schwartz | 382/232 |
| 5,432,871 | 7/1995 | Novik | 382/232 |
| 5,592,571 | 1/1997 | Peters | 382/261 |

*Primary Examiner*—Bipin Shalwala
*Assistant Examiner*—Daniel G. Mariam
*Attorney, Agent, or Firm*—Rogers & Killeen

[57] ABSTRACT

A method of enhancing a digital image that was transmitted with a reduced amount of digital data representing the digital image in which the differences between pixels in the digital image before compression are compared to corresponding pixels in a compressed version of the digital image and in which a statistical distribution of the differences is evaluated to determine which of the differences should be corrected. A receiver identifies portions of a received digital image that are to be enhanced, and a transmitter forms an error image for the identified portions. The amount of digital data in the error image may be reduced by selecting for transmission parts of the error image in which the amount of digital data that is needed to enhance the received digital image is less than a predetermined number of bits, the predetermined number of bits being selected from the distribution of the differences so as to enhance at least a predetermined percentage of the received digital image. Portions of the received image may be enhanced to have zero image loss.

8 Claims, 2 Drawing Sheets

REVERSE PRIORITIZED IMAGE TRANSMISSION

BACKGROUND OF THE INVENTION

The present invention relates generally to digital data processing and transmission techniques, and particularly to methods for transmitting digital video images.

Systems for transmitting video images by means of electrical or electromagnetic signals are known, and discussed in U.S. Pat. Nos. 5,128,776 and 5,426,513 that are assigned to the assignee hereof and incorporated by reference.

A video image to be transmitted is typically divided into an array of picture elements or pixels. Each pixel represents the video image at one small point of the pixel array. In some systems, a pixel may be represented by a single digital bit, either a zero or a one, indicating either the presence or absence of white in the portion of the image represented by the pixel. In more sophisticated systems, each pixel is represented by plural digital bits which permit each pixel to have more than binary values of zero and one. For example, if four bits are used to represent a pixel then the pixel may have up to sixteen different values, generally ranging from white to black. Finally, in color systems, each pixel may be represented by three sets of plural digital bits, each of the plural digital bits of a set representing the amount of one of the primary colors (red, blue or green) present at the portion of the visual image represented by the pixel. Such a scheme is often utilized in digitizing television images.

A standard broadcast color television picture may be adequately digitized into an image 768 pixels wide and 488 pixels high with each pixel having a depth of 24 bits (8 bits each of red, blue and green). Each screen image then contains approximately 375,000 pixels or approximately 9 million bits of digital data. While such large amounts of data can readily be sent by large bandwidth transmission and receiving equipment, it is often desired to send such digital video images by less expensive and more readily available low speed equipment such as HF (high frequency) radio and telephone voice lines. Such low speed devices typically operate at anywhere from 1200 to 9600 bits per second. If a single digital television image is sent via such a low speed transmission link, for example, a 2400 bps link, approximately 65 minutes would be needed to send a single image. In a tactical military situation, a transmission of such duration is usually desired to be avoided as such a long duration transmission could readily be detected and jammed.

While visual images in the form of television signals may be transmitted quite accurately by VHF equipment, VHF transmissions are generally limited to the line of sight between the transmitter and the receiver. Consequently, it is often desired to send television and other video image signals at other than VHF frequencies. For example, the use of HF signal carriers often permits worldwide communication between transmitter and receiver as the HF signal can be bounced or reflected off the ionosphere and back to earth. However, conventional HF systems do not have sufficient bandwidth to send real time television signals.

Many of the known video image transmission systems transmit an entire screen of data. Often, however, only certain portions of the screen are of interest and some portions of the image may be more important than others. One known system transmits an image and increases image detail as a user zooms in on an area of interest, although the system is not practical for relatively slow data rate transmission systems. See, for example, U.S. Pat. No. 5,321,520 to Inga, et al.

Moreover, selective enhancement techniques of the prior art are relatively fixed in that the operators have little opportunity to determine how the image is to be enhanced after having selected the portions that are to be enhanced. It would, for example, be desirable to afford users with the opportunity to select an enhancement level that may be economically achieved. In some systems, important portions are retransmitted in their entirety, thereby replacing the previous, more compressed, data. To avoid transmission of a portion in its entirety, it is also known to remove some high frequency components, or to select certain, less important, portions of the image for more compression than other portions. However, these systems do not evaluate the differences between the original and the compressed images so that image enhancements may be economically provided. See, for example, U.S. Pat. No. 5,333,212 to Ligtenberg and U.S. Pat. No. 5,289,548 to Wilson, et al.

Accordingly, it is an object of the present invention to provide a novel method of enhancing a compressed digital image that obviates the problems of the prior art.

It is another object of the present invention to provide a novel method of enhancing a digital image that was transmitted with a reduced amount of digital data in which differences between pixels in the uncompressed and the compressed digital image are compared and a statistical distribution of the differences is evaluated to determine which of the differences may be corrected to enhance the digital image more efficiently.

It is yet another object of the present invention to provide a novel method for enhancing a received digital image in which a receiver identifies portions of the digital image that are to be enhanced, in which a transmitter forms an error image for the identified portions, and in which the amount of digital data in the error image is reduced by selecting for transmission parts of the error image in which the amount of digital data that is needed to enhance the received digital image is less than a predetermined amount.

It is still another object of the present invention to provide a novel method of transmitting a digital image that is selectively enhanced in which amount of digital data to be transmitted to enhance the image is selected for transmission based on the pixel-by-pixel differences between pixels in selected portions of the received image and the corresponding pixels in the uncompressed image, and in which at least a predetermined percentage of the pixels are corrected.

It is a further object of the present invention to provide a novel method of enhancing a digital image that was transmitted with a reduced amount of digital data in which differences between pixels in the uncompressed and the compressed digital image may be reduced to zero in selected portions of the image.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
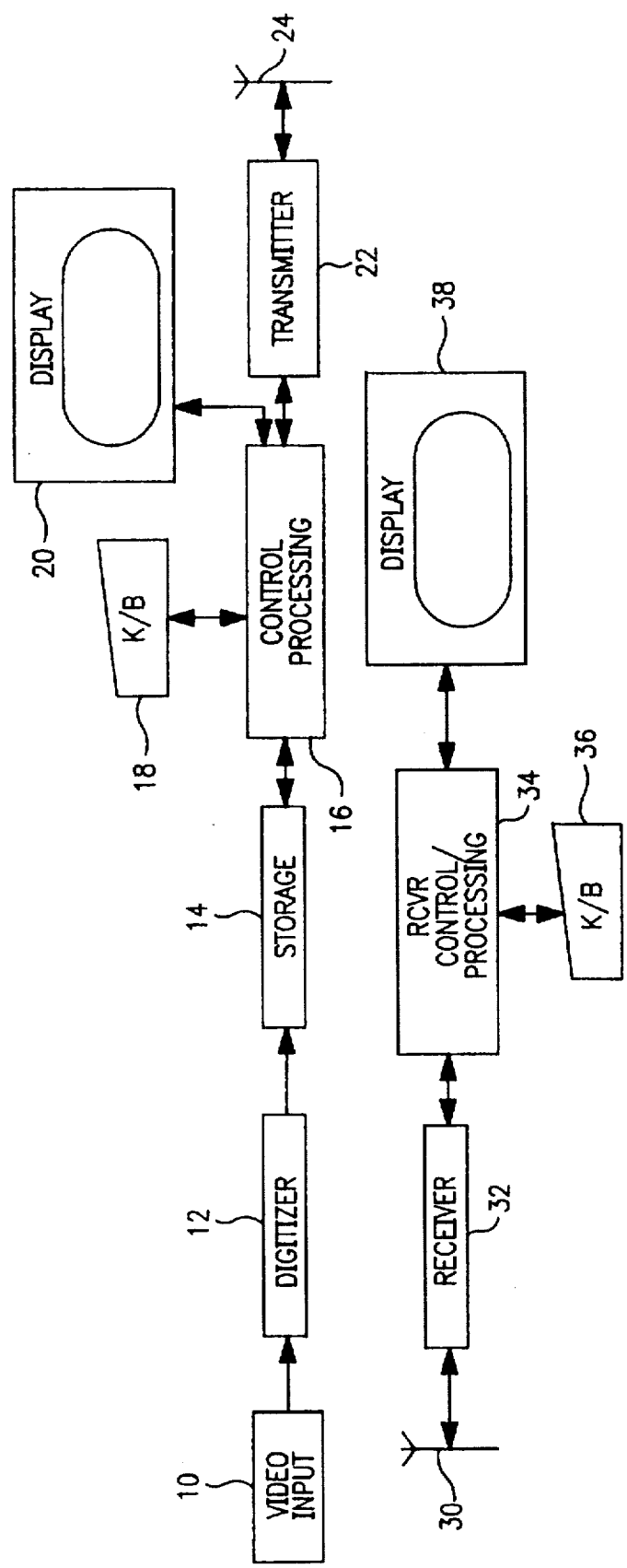
FIG. 1 is a block diagram of an image transmission system in which the method of the present invention finds application.

With reference to FIG. 1, a video input device 10 may receive or generate a video signal in a conventional analog signal format in correspondence to a sensed visual image. The signal may be color encoded. The analog signal from the video input device 10 may be digitized by a digitizer 12 which periodically produces a digital signal related to the gray level and/or the color of the video input signal. The digital signals produced by the digitizer 12 may be stored in a storage device 14 in an array which has reference to the position of each of the digital signals within the image being provided by video input device 10. Accordingly, each of the digital signals may be considered a picture element, or pixel, relating the video image seen by video input device 10 to a particular position within the entire video image and the digital storage array may be considered a digital map of the visual image. In a standard television signal, for example, the video input signal is often stored in an array which has 768 pixels horizontally and 512 pixels vertically. However, the exact number of pixels into which a visual image is divided is not significant to the present invention.

The pixels may be related to the gray level of the visual image, and/or may be related to the color of the image, i.e., how much of the colors red, green, and blue are detected by the detectors within video input device 10.

Once the pixels are stored in storage device 14, they may be acted upon by control/processing unit 16 which is controlled by a keyboard/mouse 18 and/or a monitor 20 with touch-sensitive screen. The video signal represented by the stored pixels available to control/processing unit 16 may be displayed on monitor 20. Upon command of the transmitter operator or automatically, a signal which contains all or a portion of the visual image stored in storage device 14 may be sent to a transmitter 22 to be transmitted to a remote device via a transmitter antenna 24. When the transmitted signal is received at a receiver antenna 30, it may be sent to a receiver 32 which removes any carrier signal or the like which may have been used during the transmission and provides the visual image signal to a receiver control/processing unit 34 which is, in turn, controlled by a keyboard/mouse 36 and/or monitor 38 with touch-sensitive screen, through which commands may be entered by the receiver operator. Upon the command of the receiver operator, or automatically, receiver control/processing unit 34 may provide the visual signal to display unit 38.

Video input device 10 may be any conventional video input unit such as a black-and-white television camera, a color television camera, a facsimile machine, an optical scanner, or similar device which converts visual or optical imagery into an electrical or electromagnetic signal. Storage device 14 and control/processing units 16 and 34 may be conventional computer or personal computer storage and control systems. Display monitors 20 and 38 may be conventional television monitors (black-and-white, monochrome, or color) or similar devices on which a visual image may be obtained from electronic signals.

Control/processing unit 16 provides the visual image data to transmitter 22 which may transmit the data in a conventional format. Receiver control/processing unit 34 and associated keyboard 36 may also be a conventional computer or personal computer and may include a volatile memory to temporarily hold visual image data and/or permanent storage device such as magnetic disks to save, for a longer term, selected desired visual images.

In a preferred embodiment, the receiver operator may select for display portions of the compressed digital image where image compression is to be reduced (have higher resolution). The image may be compressed before transmission with a lossy compression algorithm in transmitter control/processing unit 16 and transmitted to receiver 32. A receiver operator viewing the received compressed image at display 38 may select portions of the image that are to be enhanced (received with higher resolution.) The selected portions are identified to receiver control/processing unit 36 for transmission to transmitter control/processing unit 16 for formation of an error image. The error image is the difference between the compressed image and the original image stored in storage 14 and is formed for the portions selected at display 38. The error image may be quickly computed by subtracting the compressed image from the original image, and thus when the errors are added to the compressed image the original is exactly restored no matter how strongly the original image was compressed. The error image is transmitted to receiver control/processing unit 34 where it is added to the compressed image so that the selected portions are displayed with a higher resolution.

The receiver operator may specify one or more portions of the visual video image that are to be enhanced. The video image may be divided into conveniently sized blocks of data for ease of selection and manipulation. The receiver operator may select the resolution, compression level, and order of transmission (in the event more than one portion is desired to be sent) for each portion (i.e., a group of blocks) of the image which he desires to have enhanced. After the receiver operator selects the one or more portions to be enhanced receiver control/processing unit 36 instructs transmitter control/processing unit 16 to obtain the digital data from the storage unit 14 which correspond to the selected portions of the original image. The digital data corresponding to the selected portions may then be processed by the control/processing 16 unit to compare the original image to the compressed image and to provide an error image that is the difference between the two. The digital data corresponding to the selected portions may then be loaded into communication packets which may be provided, in the order selected by the receiver operator, to the transmitter for transmission to the receiver portion of the system.

The receiver operator may instruct control/processing units 16 and 36 to provide a grid overlay on the visual image. Through use of conventional input devices such as a keyboard 36, or mouse, etc., the receiver operator may then specify a specific block (e.g., a 64 pixel by 64 pixel section of the image) or specific location within the grid which is of particular interest to the operator for enhancement. To assist the operator in selecting the portion of the screen, the control/processing unit 36 may construct overlays on display 38 which define for the operator what portions of the image he has selected. Such definition could be provided by shading the visual image with particular colors or particular hues to indicate the selected portion and the resolution and compression selected.

Figure 2:
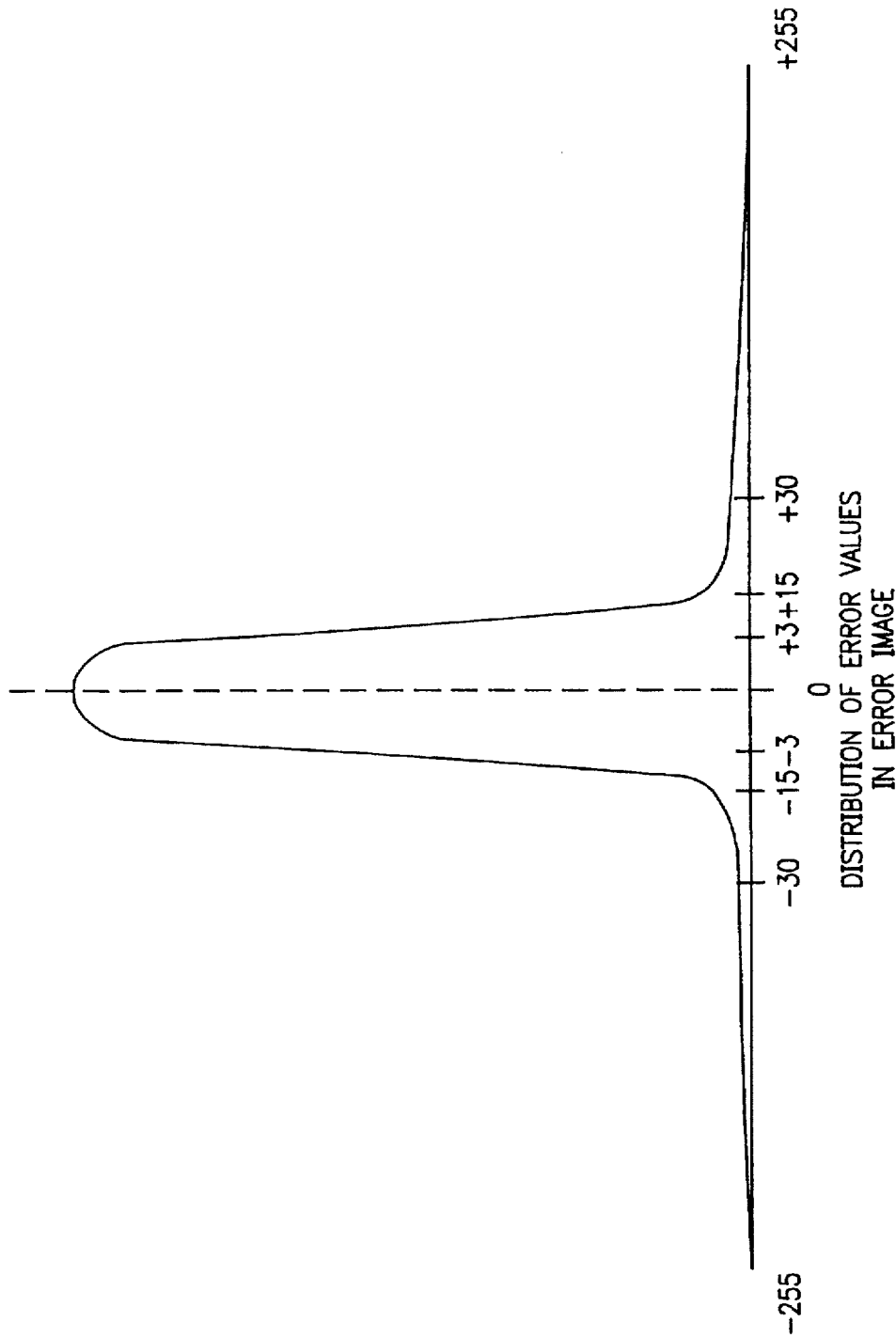
FIG. 2 is a distribution of error image error values exemplary of that used in the present invention to determine an acceptable level of image enhancement.

The amount of digital data in the error may be reduced by selecting a level of image enhancement. The error image may be evaluated by forming a statistical distribution of the pixel-by-pixel errors. With reference now to FIG. 2, the distribution of errors in an error image may be Gaussian (although other distributions may be obtained and the present invention is not limited to Gaussian distributions.) It has been found that the distribution of errors typically has a narrow peak with a small standard deviation. For example, in an 8 bit system with ±256 possible error values, almost all errors are within 30 of zero, 90% of errors are within 15 of zero and 80% of errors are within 3 of zero. Thus, by way of example, 80% of the pixels of a compressed image may be restored to their original image quality (made loss-less) by the addition of only a small value to the compressed pixel value.

The application of statistical analysis to the error image allows the receiver operator to select the level of enhancement by selecting a percentage of pixels to be corrected for each of the identified portions of the image. For example, the predetermined percentage may be from one standard deviation of the statistical distribution to 100%. The pixel corrections transmitted from the transmitter portion of the system may be added to the corresponding pixels in the compressed image in receiver control/processing unit 34.

The pixel corrections selected for transmission may be further reduced in size by conventional compression techniques, such as Huffman encoding by which most of the corrections may be reduced to two or three bits per pixel. This could be accomplished by applying Joint Photographic Expert Group (JPEG) corrections to the error image with a very low compression factor.

In an alternative embodiment, the receiver operator may progressively increase the level of enhancement until a desired level is achieved. For example, the small errors (±3 bits) may be corrected first, and larger errors may be corrected separately later. JPEG compression of errors, even larger ones, does not significantly increase overhead so that transmission time is not greatly different from single-pass systems.

The method of the present invention may be used in an attended or unattended image transmission system. For example, the system may include a high-resolution digital camera, an image processing unit, and an image transmission unit such as an HF radio. Operation may be triggered by a sensor, a timer, or remote command from an operator at an image receiving unit. When the sensor is triggered a high resolution image may be compressed (4.5 megabytes uncompressed) and transmitted to the receiver. The receiver may select important regions for enhancement (e.g., face, license plate, etc.)

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of enhancing a second digital image that was transmitted to represent a first digital image with a reduced amount of digital data, comprising the steps of:

(a) determining differences between pixels in the first digital image and corresponding pixels in the second digital image, the second digital image being a compressed version of the first digital image; and (b) evaluating a statistical distribution of the determined differences to determine which of the differences are to be transmitted to enhance the second digital image;

(c) selectively identifying at the receiver portions of the received second digital image that are to have their amount of digital data increased to enhance the image represented thereby, and instructing the transmitter from the receiver to provide enhancement information for the identified portions; and (d) forming at the transmitter an error image for the identified portions, the error image being the statistically determined differences that form an enhanced second digital image when combined with the identified portions of the second digital image.

2. The method of claim 1 further comprising the steps of reducing the amount of digital data in the error image to be transmitted by selecting for transmission parts of the error image in which the amount of digital data that is needed to enhance the second image is less than a predetermined amount, the predetermined amount being selected based on the statistical distribution so as to enhance at least a corresponding predetermined percentage of the identified portions of the received second digital image, and combining the selected parts of the error image with the identified portions of received second digital image at the receiver to enhance the image represented by the digital data.

3. The method of claim 1 wherein the first and the second digital image comprises pixels and further comprising the step of forming the statistical distribution by evaluating on a pixel-by-pixel basis the numerical difference between corresponding pixels in corresponding portions of the first and second digital images.

4. A method of selectively enhancing a digital image that has been transmitted with a reduced amount a digital data representing the image, comprising the steps of:

(a) identifying at a receiver portions of a received digital image that are to have their amount of digital data increased to enhance the image represented thereby;

(b) forming at a transmitter an error image for the identified portions, the error image being digital data that forms an enhanced digital image when combined with a corresponding part of the received digital image;

(c) reducing the amount of digital data in the error image to be transmitted by selecting for transmission parts of the error image as a function of the statistical distribution of the error image in which the amount of digital data that is needed to enhance the received digital image is less than a predetermined amount, the predetermined amount being selected so as to enhance at least a corresponding predetermined percentage of the identified portions of the received digital image; and (d) combining the selected parts of the error image with the corresponding parts of the received digital image at the receiver to enhance the image represented by the digital data.

5. The method of claim 4 wherein the selected parts of the error image are pixels, and the predetermined amount is a number of digital data bits that will enhance the corresponding predetermined percentage of pixels in the digital image.

6. The method of claim 5 further comprising the steps of evaluating on a pixel-by-pixel basis the numerical difference between each pixel in the identified portions of the received image and the corresponding pixel in the digital image before it was reduced for transmission, and selecting the predetermined amount based on the number of digital data bits needed to eliminate a predetermined numerical difference.

7. The method of claim 6, wherein the step of reducing the amount of digital data comprising the step of forming a statistical distribution representing the numerical difference between each pixel in the identified portions and the corresponding pixel in the digital image, and selecting the predetermined amount by evaluating the statistical distribution.

8. The method of claim 7 wherein the predetermined percentage is from one standard deviation of the statistical distribution to 100%.

* * * * *